United States Patent
Barrows et al.

(10) Patent No.: US 7,137,405 B2
(45) Date of Patent: Nov. 21, 2006

(54) LOW PRESSURE CHECK VALVE

(75) Inventors: Richard F. Barrows, Vancouver, WA (US); Mike Hamilton, Vancouver, WA (US)

(73) Assignee: SEH America, Inc., Vancouver, WA (US)

( * ) Notice: Subject to any disclaimer, the term of this patent is extended or adjusted under 35 U.S.C. 154(b) by 323 days.

(21) Appl. No.: 10/839,815

(22) Filed: May 5, 2004

(65) Prior Publication Data

US 2005/0247349 A1    Nov. 10, 2005

(51) Int. Cl.
*F16K 15/03* (2006.01)

(52) U.S. Cl. .................. 137/527.4; 137/527; 137/859; 251/331; 118/715

(58) Field of Classification Search .............. 137/527, 137/527.4, 527.6, 527.8, 859; 251/331, 359
See application file for complete search history.

(56) References Cited

U.S. PATENT DOCUMENTS

| | | | |
|---|---|---|---|
| 73,038 A * | 1/1868 | Pollard | 137/858 |
| 2,526,019 A * | 10/1950 | Fowler | 137/859 |
| 2,881,795 A * | 4/1959 | Waldenmaier et al. | 137/855 |
| 3,075,547 A * | 1/1963 | Scaramucci | 137/516.29 |
| 4,502,503 A * | 3/1985 | Karpenko | 137/527.8 |
| 4,867,200 A | 9/1989 | Markley | |
| 5,060,689 A | 10/1991 | Csaszar et al. | |
| 5,390,895 A * | 2/1995 | Iwabuchi | 251/60 |
| 5,904,338 A * | 5/1999 | Unruh et al. | 251/359 |
| 6,019,116 A * | 2/2000 | Schell | 137/14 |
| 6,397,874 B1 | 6/2002 | Featheringill et al. | |

* cited by examiner

*Primary Examiner*—Ramesh Krishnamurthy
(74) *Attorney, Agent, or Firm*—Schwabe, Williamson & Wyatt, P.C.

(57) ABSTRACT

A check valve for preventing backflow of media including a valve movably coupled to a carrier body, the valve including a flexible membrane disposed therein such that the flexible membrane flexibly engages an aperture in the carrier body to prevent backflow of media through the aperture.

21 Claims, 2 Drawing Sheets

LOW PRESSURE CHECK VALVE

FIELD OF THE INVENTION

Disclosed embodiments of the invention relate to the field of check valves, and more particularly, embodiments of the invention relate to check valves that are effective and responsive to even slight changes in pressure.

BACKGROUND OF THE INVENTION

Check valves are used in a variety of situations, and particularly where the flow of a media, such as gaseous exhaust or fluid discharge, is desired in one direction. One example where flow in only one direction is not only desired, but critical, is in the silicon wafer manufacturing processes where reactors are used to process silicon wafers. Due in part to the nature of the materials used and processes performed, these reactors exhaust gases that may be extremely hazardous and/or toxic. These gases are typically exhausted through a manifold into an exhaust stream that may undergo further treatment before final discharge.

In certain systems, there may often be a slight positive pressure in the exhaust stream, or situations may arise where a positive pressure in the exhaust stream is created. To prevent backflow of the media being exhausted, a check valve may be used between the reactor and the exhaust stream. Backflow is undesirable, as it may force hazardous or toxic material out of the system, through a reactor chamber, or contaminate a section of a reaction chamber. Such a discharge can further result in exposure to personnel and result in potential contamination of silicon wafers in process. Check valves are used in other processes as well, as backflow can have just as serious consequences.

A variety of check valves are known. One common check valve includes a simple rigid valve flap, or swing check valve, attached to an piping body in a hinged fashion such that flow of media through the opening forcing the flap of the valve to swing away from the opening. When media is not being exhausted, the flap may close over the opening through the influence of gravity and the backflow pressure to prevent backflow of the media. This type of check valve may work well in situations where the downstream to upstream pressure differential is larger (e.g., much greater than two inches of water column) or where there is a substantial negative pressure downstream that tends to pull the exhaust away from the reactor chamber.

These valves are relatively ineffective, however, where the pressure differentials are extremely low, such as, for example, less than or equal to one inch of water column. A greater amount of back pressure is required than is typically present in these systems to have the rigid flap of the check valve sufficiently seal against the orifice in order to prohibit the exhaust from flowing back into the reactor chamber. Additionally, whereas in the case of reactors in the silicon manufacturing process, where there is a slight positive pressure downstream from the valve, these valves do not react fast enough, or seal sufficiently enough, to prevent exhaust from flowing back into the reactor chamber and out to the operating environment if the reactor chamber is open to the atmosphere.

A second common type of check valve includes spring-biased valves, similar to those disclosed in U.S. Pat. Nos. 4,867,200 and 5,060,689. In these systems, a spring maintains a constant bias against an orifice plate such that only upstream pressure can displace the orifice plate against the spring allowing the exhaust to enter the exhaust stream. However, if the upstream pressure is reduced, for example becomes atmospheric, the spring forces the orifice plate against the orifice to prevent backflow. The spring-biased check valves may not operate sufficiently or effectively at extremely low pressure differentials, in that they may require too much "cracking pressure": (i.e. greater than 2 inches of water column, which may be impermissible in certain systems). Further, the spring check valves have more parts that may be prone to failure. Moreover, the spring-biased check valves are usually more invasive in piping systems. Therefore, an improved, low pressure check valve is needed.

BRIEF DESCRIPTION OF THE DRAWINGS

The invention is illustrated by way of example and not by way of limitation in the figures of the accompanying drawings, in which the like references indicate similar elements and in which.

DETAILED DESCRIPTION OF EMBODIMENTS OF THE INVENTION

In the following detailed description, reference is made to the accompanying drawings which form a part hereof wherein like numerals designate like parts throughout, and that is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Figure 1:
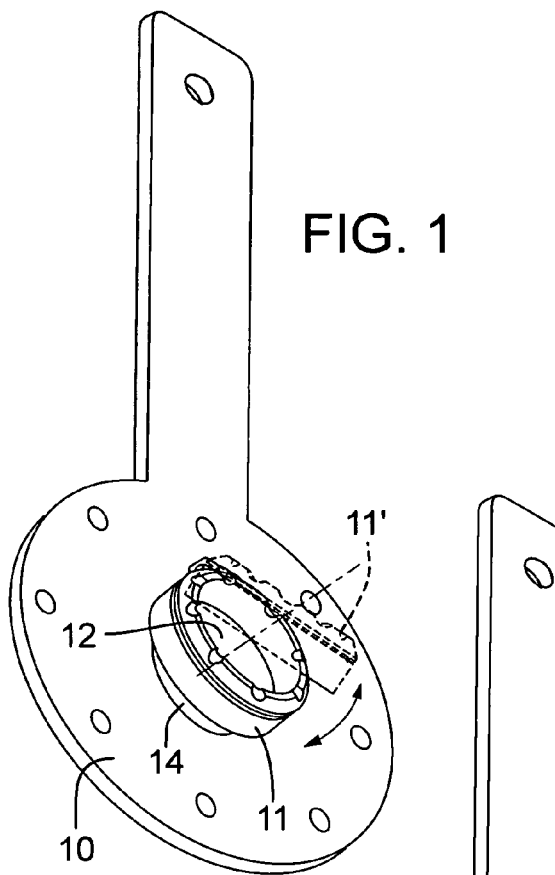
FIG. 1 illustrates a perspective view of a check valve in accordance with an embodiment of the present invention.

FIG. 1 illustrates a perspective view of a check valve in accordance with an embodiment of the present invention. Specifically, carrier body 10 may have a first aperture 12 or orifice disposed therein, which is appropriately sized to enable passage of a media through the first aperture 12. Carrier body 10 may be adapted for placement in a pipe in which media may be flowing through, and positioned such that the media can flow through the orifice. Carrier body 10 may be a typical orifice place that may be inserted in the pipe, for example, between a flange, or through a union, coupler, or other like junction (not shown). The media that flows through the valve may include, but is not limited to, gaseous or liquid type discharge streams, such as the hazardous exhaust from a reactor chamber in a silicon wafer manufacturing process.

A valve 11 may be movably connected to carrier body 10, which can close against first aperture to prevent backflow of media, or swing open (as shown by broken lines 11') to allow media to flow through the first aperture 12. Carrier body 10 and valve 11 may be made of a variety of materials, including but not limited to stainless steel, PVC or Teflon. The selected material is preferably non-reactive to the chemicals used in the particular system. Valve 11 includes a flexible membrane that may allow for the valve 11 to be more sensitive and reactive to backflow pressures. With the slightest backflow pressure (i.e., when the downstream pressure becomes greater than the upstream pressure) the flexible membrane may deflect inwardly in a trampoline-like manner that may cause the valve 11 to close in a more responsive manner. The inward deflection of the flexible membrane may also allow the flexible membrane to flexibly engage the first aperture and create a more effective and reliable seal between valve 11 and the first aperture 12.

Figure 2:
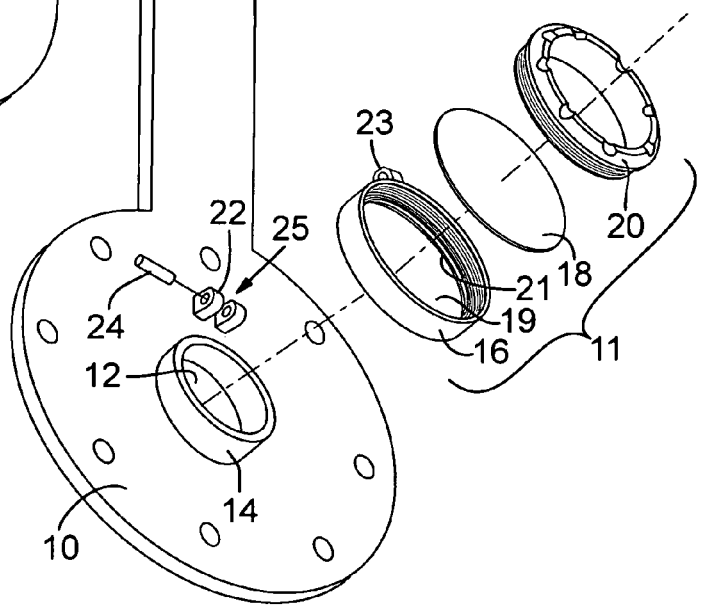
FIG. 2 illustrates an enlarged cross-sectional perspective view of the check valve of FIG. 1 in accordance with an embodiment of the present invention.

FIG. 2 illustrates an enlarged cross-sectional perspective view of the check valve if FIG. 1 in accordance with an embodiment of the present invention. Carrier body 10 includes a first aperture 12 having a first diameter. First aperture 12 is sized as desired to enable media to pass there through. A raised seat 14 can generally encompass first aperture 12 and provide an engagement point for valve 11, when in the closed position. Though raised seat 14 is shown to have the same diameter as the first diameter of aperture 12, raised seat 14 may have a larger diameter and be circumferentially offset from the first aperture. Or, the raised seat 14 may be circumferentially inset from the first aperture (e.g., inwardly tapered), in which case the diameter of the raised seat defines the first diameter of the first aperture.

Valve 11 may include a valve body 16 having a second aperture 19 disposed therein. Second aperture 19 may be defined by annular lip 21 having a second diameter. Flexible membrane 18 may be positioned over second aperture 19 of valve body 16 by being sized to engage lip 21 such that flexible membrane 18 entirely covers the second aperture 19. Flexible membrane 18 then may be secured to lip 21 by retainer 20. Retainer 20 may threadably engage the valve body 16 in order to secure flexible membrane 18 to lip 21. Retainer 20 may also be a press fit type fitting, O-ring, or other device that can ensure the flexible membrane 18 is secured to lip 21 such that media cannot pass through the interface between flexible membrane 18 and lip 21.

It can be appreciated by one of skill in the art that flexible membrane 18 need only be disposed about valve body 16 such that it covers the second aperture 19. The flexible membrane 18, then, may be disposed about second aperture 19 in a variety of ways. For example, though not shown, the flexible membrane may extend beyond the outer periphery of the valve body and be secured in place by a retainer that is adapted to engage the outer edge of the valve body.

Valve 11 may be movably coupled to carrier body 10 through, for example, a pivoting or hinged mechanism. In one embodiment in accordance with the present invention, the valve 11 may be hingedly coupled to the carrier body 10 using a clevis mechanism, where lobe 23, secured to valve body 16, is pinned between lobes 22 secured to carrier body 10, by pin 24, thus creating hinge point 25. In one embodiment in accordance with the present invention, lobes 22 may be secured to the valve body 16 and lobe 23 may be secured to carrier body 10.

It can be appreciated that the number of lobes used to hingedly connect the valve body to the carrier body may be of any number and configuration, provided that valve 11 may be movably coupled to carrier body 10. It can further be appreciated that valve body 16 may be movably coupled to carrier body 10 in a variety of other ways that may enable the valve body to move away from the first orifice of the carrier body.

Valve 11 may be coupled to the body in a manner that may be conducive to allowing the self-centering of the valve to encourage a better seal of the flexible membrane to the valve seat. In one embodiment, one or more of the lobes in which the pin may engage may be oversized or shaped larger than that of the pin to allow for valve movement, in addition to pivoting movement. Such additional movement may include, but is not limited to lateral movement, transverse movement, movement of the hinge point perpendicular to the carrier body, and movement of the hinge point parallel to the valve body. Accommodating such additional movement may allow the membrane of the valve to better seat on the raised seat of the carrier body.

In one embodiment, the apertures in lobes 22 may be elongated such that pin 24 can move inward and outward in relation to the body 10. Such additional movement may allow for the valve body to shift as needed in order to self-center on the seat and achieve a reliable seal. It can be appreciated, however, that other adjustments and modifications can be made to encourage better seating of the flexible membrane on the valve seat.

Figure 3A:
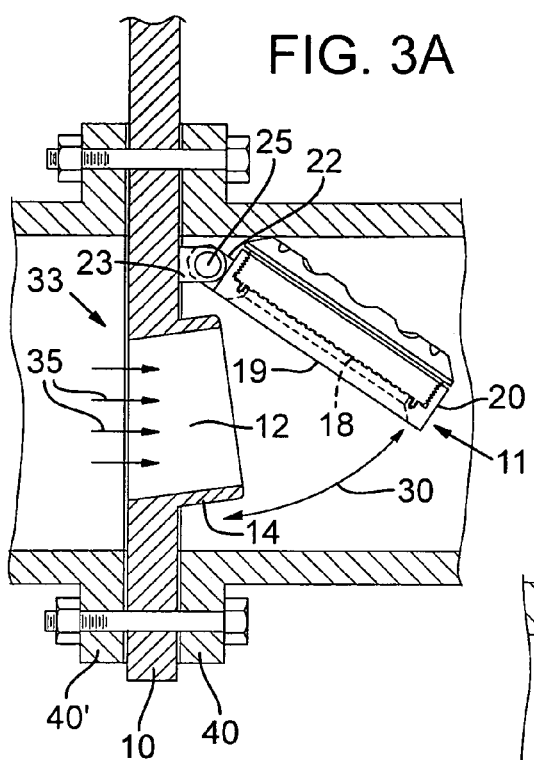
FIGS. 3A and 3B Illustrate cross-sectional views of a check valve in accordance with an embodiment of the present invention.
Figure 3B:
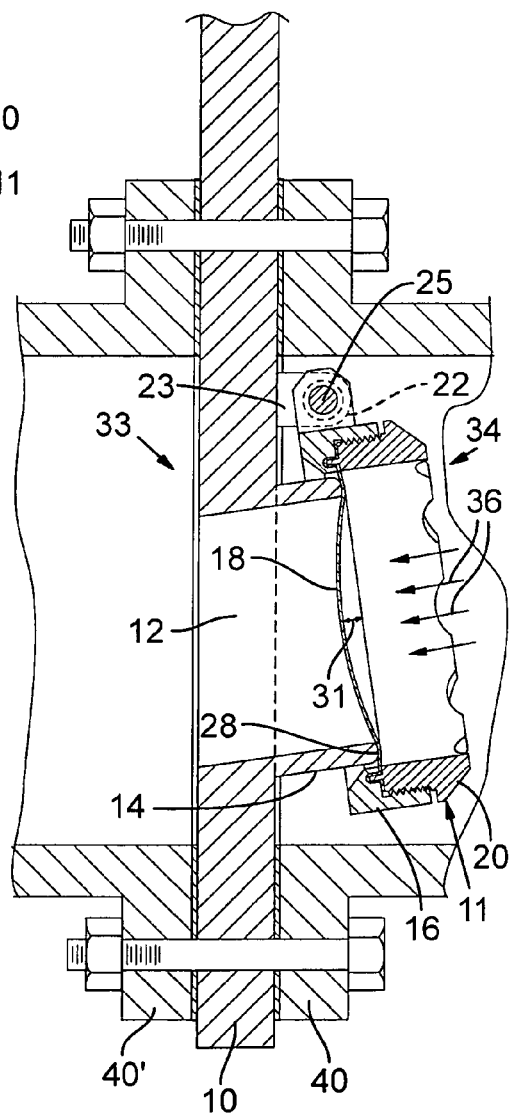

FIGS. 3A and 3B illustrate cross-sectional views of a check valve in accordance with an embodiment of the present invention. FIG. 3A illustrates a check valve disposed in a piping system between flanges 40 and 40', where the valve is in the open position. In the open position, media flow, shown by 35, from the upstream side 33 of the carrier body 10, passes through first aperture 12 thereby causing valve 11 to swing outwardly on hinge point 25. Because flexible membrane 18 is secured over second aperture 19, media flow 35 forces the valve 11 to open along path 30, such that the media flow 35 may pass through first aperture 12 into the exhaust stream on the downstream side 34 of the check valve.

FIG. 3B illustrates a cross-sectional view of the check valve of FIG. 3A, where the valve is in the closed position. When conditions change such that the pressure on the downstream side 34 becomes greater than that on the upstream side 33 valve 11 will close to prevent media flow 36 to pass from downstream side 34 to upstream side 33, also known as backflow. Flexible membrane 18 may allow valve 11 react to even the slightest downstream positive pressure to close valve 11 against raised seat 14.

Flexible membrane 18 also may ensure that a reliable seal is formed to prevent seepage of media back through the first aperture 12. To do so, flexible membrane 18 may deflect inwardly as a result of the pressure created by the backflow 36 to flexibly engage raised seat 14. The inward deflection, shown by 31, creates a better seal at seal point 28, than would be typically formed by traditional rigid flap-type check valves. The seal created by the inward deflection 31 of the flexible membrane 18 thus may prevent media 36 from flowing back through the valve, even when the downstream 34 pressure is only slightly positive, or greater, in relation to the upstream 33 pressure. Adjusting the material and shape of seat 18, such as by adding grooves, adjusting the hardness of the material, or adjusting the radius of the seat 18 as described below, may also affect seal quality.

It can be appreciated that to enhance the sealing properties, the second diameter of the second aperture 19 may be larger than the first diameter of the first aperture 12. This may allow for the flexible membrane to fully engage the edge of the raised seat 14 at seal point 28. The ratio of the second diameter to the first diameter may be increased as desired to enhance the seal. It can be appreciated, however, that anything less than a 1:1 ratio would result in the valve being ineffective to prevent backflow. Further, a 1:1 ratio may not allow the inward deflection of the flexible membrane to adequately seal, as the edge of the raised seat may be in contact with the edge of the valve body 16.

As shown, raised seat 14 is slightly angled upward from a first point on the raised seat closest to the hinge point 25 toward a second point on the raised seat farthest away from the hinge point 25. Such an angle may allow for a faster seal to form on the edge of the raised seat 14 as it reduces the amount of distance the valve 11 must travel (as shown by 30 in FIG. 3A) in order for the flexible membrane to form the seal at seal point 28. It has been found that an angle between 0 and 45 degrees, and more preferably between 2 and 15 degrees, may create an effective seal. The raised seat need not be angled, however, for the flexible membrane to create an effective seal. Further, a raised seat is not necessary for the flexible membrane to form a seal with the first aperture. Without the raised seat, the flexible membrane may deflect inwardly such that it flexibly engages the first aperture by protruding into or through the first aperture to create a seal about the periphery of the first aperture.

A variety of materials may be used for the flexible membrane, and should be chosen based on the environment in which the valve is being used. For example in highly corrosive environments, such as exhaust streams from reactors of wafer processing facilities, a thin Teflon® layer, such as EPTFE® manufactured by Gortex®, may be used as the flexible membrane, as Teflon® has been found to withstand certain corrosive environments. Further, when a thin enough layer of Teflon® is used, such as between 0.5–2 mils., it is flexible enough that it may adequately deflect inwardly to create a seal with the first aperture to prevent backflow. In environments where extreme temperatures may be an issue, other material may be used, such as ultra thin alloys and high-temperature plastics.

The flexible membrane may be made of a porous or nonporous material. Where a porous material is used, it is desirable to choose a material that will not allow passage of media through the membrane at the potential backflow pressures that may be encountered. Again, Teflon®, even at less than 1 mil. thickness, has been found to be effective to resist penetration of media at lower backflow pressures, such as those that may be encountered in the wafer fabrication process.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A valve, comprising:
a carrier body having a first aperture sized to allow media to pass there through;
a valve movably coupled to the carrier body, the valve including a valve body having a second aperture and a flexible membrane disposed over the second aperture, the flexible membrane adapted to respond to a back pressure by flexibly engaging the first aperture to create a seal with the first aperture;
the first aperture has a first diameter and the second aperture has a second diameter, and the first diameter is less than or equal to the second diameter such that the flexible membrane will engage an inner edge of the first aperture when back pressure is applied against the flexible membrane;
the carrier body includes a raised seat that surrounds the first aperture and is adapted for engagement with the flexible membrane;
the valve is movably coupled to the carrier body by a hinge at a hinge point;
the hinge is adapted to allow for valve movement in addition to pivoting movement; and
wherein the hinge includes a pin, a first at least one lobe and a second at least one lobe, the first and second at least one lobes including an aperture for receiving the pin, and the aperture of the first at least one lobe being oversized to allow movement of the valve at the hinge point.

2. The valve of claim 1, wherein the raised seat has an inner diameter that is substantially the same as the first diameter.

3. The valve of claim 1, wherein the raised seat is angled from a first point on the raised seat closest to the hinge point to an second point on the raised seat farthest away from the hinge point.

4. The valve of claim 3, wherein the angle of raised seat is between 0 and 45 degrees.

5. The valve of claim 3, wherein the angle of raised seat is between 2 and 15 degrees.

6. The valve of claim 1, wherein the first at least one lobe is secured to the carrier body and the second at least one lobe is secured to the valve.

7. The valve of claim 1, wherein the carrier body is an orifice plate.

8. The valve of claim 1, wherein the flexible membrane is made from material selected one of a group consisting of Teflon® and EPTFE®.

9. The valve of claim 8, wherein the flexible membrane has a thickness between 0.5 and 2 mils.

10. An exhaust system for a material processing system, comprising:
a reactor;
an exhaust stream adapted to carry media away from the reactor, the reactor being coupled to the exhaust stream;
a check valve disposed between the reactor and the common exhaust stream to prevent backflow of media into the reactor, the check valve including a carrier body having a first aperture sized to allow media to pass there through, and a valve movably coupled to the carrier body, the valve including a valve body having a second aperture and a flexible membrane disposed over the second aperture, the flexible membrane adapted to respond to a back pressure by flexibly engaging the first aperture to create a seal with the first aperture;
the first aperture has a first diameter and the second aperture has a second diameter, and the first diameter is less than or equal to the second diameter such that the flexible membrane will engage an inner edge of the first aperture when back pressure is applied against the flexible membrane;
the carrier body includes a raised seat that surrounds the first aperture and is adapted for engagement with the flexible membrane;
the valve is movably coupled to the carrier body by a hinge at a hinge point;
the hinge is adapted to allow for valve movement in addition to pivoting movement; and
wherein the hinge includes a pin, a first at least one lobe and a second at least one lobe, the first and second at least one lobes including an aperture for receiving the pin, and the aperture of the first at least one lobe being oversized to allow movement of the valve at the hinge point.

11. The system of claim 10, wherein the raised seat has an inner diameter that is substantially the same as the first diameter.

12. The system of claim 10, wherein the raised seat is angled from a first point on the raised seat closest to the hinge point to a second point on the raised seat farthest away from the hinge point.

13. The system of claim 10, wherein the angle of raised seat is between 0 and 45 degrees.

14. The valve of claim 10, wherein the angle of raised seat is between 2 and 15 degrees.

15. The valve of claim 10, wherein the first at least one lobe is secured to the carrier body and the second at least one lobe is secured to the valve.

16. The system of claim 10, wherein the carrier body is an orifice plate.

17. The valve of claim 10, wherein the flexible membrane is made from a material selected one of a group consisting of Teflon® and EPTFE®.

18. The system of claim 17, wherein the flexible membrane has a thickness between 0.5 and 2 mils.

19. The system of claim 10 wherein the processing system is a silicon wafer processing system.

20. The system of claim 10 wherein the valve body is made of a corrosion resistant material.

21. The system of claim 20 wherein the corrosion resistant material is a selected one of a group consisting of stainless steel, PVC, and Teflon®.

* * * * *